(12) United States Patent
Bhamri et al.

(10) Patent No.: US 11,528,100 B2
(45) Date of Patent: Dec. 13, 2022

(54) HARQ-ACK HANDLING WITH MULTIPLE PUCCH IN MULTI-TRP TRANSMISSION IN NR

(71) Applicant: Panasonic Intellectual Property Corporation of America, Torrance, CA (US)

(72) Inventors: Ankit Bhamri, Rödermark (DE); Hidetoshi Suzuki, Kanagawa (JP); Hongchao Li, Langen (DE); Madhav Gupta, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 36 days.

(21) Appl. No.: 17/128,350

(22) Filed: Dec. 21, 2020

(65) Prior Publication Data

US 2021/0111839 A1 Apr. 15, 2021

Related U.S. Application Data

(63) Continuation of application No. PCT/EP2019/078853, filed on Oct. 23, 2019.

(30) Foreign Application Priority Data

Oct. 31, 2018 (EP) .................... 18203856

(51) Int. Cl.
*H04L 1/18* (2006.01)
*H04L 5/00* (2006.01)
(Continued)

(52) U.S. Cl.
CPC .......... *H04L 1/1819* (2013.01); *H04L 5/0055* (2013.01); *H04W 72/1273* (2013.01); *H04W 92/24* (2013.01)

(58) Field of Classification Search
CPC ................. H04L 1/1819; H04L 5/0055; H04L 2001/0092; H04L 1/1864; H04L 1/189;
(Continued)

(56) References Cited

U.S. PATENT DOCUMENTS

2014/0050148 A1 2/2014 Choi
2017/0195089 A1 7/2017 Lee et al.
(Continued)

OTHER PUBLICATIONS

3GPP TR 36.932 V15.0.0, "3$^{rd}$ Generation Partnership Project; Technical Specification Group Radio Access Network; Scenarios and requirements for small cell enhancements for E-UTRA and E-UTRAN (Release 15)," Jun. 2018, 14 pages.
(Continued)

*Primary Examiner* — Sharmin Chowdhury
(74) *Attorney, Agent, or Firm* — Seed IP Law Group LLP

(57) ABSTRACT

The present disclosure relates to a user equipment, a network node and respective communication methods for a user equipment and a network node. A according to some embodiments, a user equipment comprises a transceiver which, in operation, receives data on a plurality of downlink shared channels, the data received on the plurality of downlink shared channels being respectively the same data, and circuitry which, in operation, decodes the data, generates an indicator which indicates whether or not the data has been successfully decoded using the plurality of downlink shared channels. The transceiver, in operation, transmits the indicator on at least one of a plurality of uplink control channels associated respectively with the plurality of downlink shared channels.

10 Claims, 10 Drawing Sheets

(51) Int. Cl.
*H04W 72/12* (2009.01)
*H04W 92/24* (2009.01)

(58) Field of Classification Search
CPC ....... H04L 1/1858; H04L 1/1845; H04L 1/08; H04L 1/1607; H04L 1/1854; H04W 72/1273; H04W 92/24
See application file for complete search history.

(56) References Cited

U.S. PATENT DOCUMENTS

| | | | |
|---|---|---|---|
| 2018/0132227 A1 | 5/2018 | Ghosh et al. | |
| 2019/0082456 A1* | 3/2019 | Kim | H04L 1/1671 |
| 2020/0015200 A1* | 1/2020 | Vilaipornsawai | H04L 25/0204 |
| 2020/0052831 A1* | 2/2020 | Yang | H04L 1/1635 |
| 2020/0154467 A1* | 5/2020 | Gong | H04L 1/189 |
| 2021/0160882 A1* | 5/2021 | Jiang | H04L 5/001 |

OTHER PUBLICATIONS

3GPP TS 38.211 V15.0.0, "3$^{rd}$ Generation Partnership Project; Technical Specification Group Radio Access Network; NR; Physical channels and modulation (Release 15)," Dec. 2017, 73 pages.
Huawei, HiSilicon, "Enhancements on multi-TRP/panel transmission," R1-1810104, Agenda Item: 7.2.8.2, 3GPP TSG RAN WG1 Meeting #94bis, Chengdu, China, Oct. 8-12, 2018, 17 pages.
International Search Report, dated Jan. 8, 2020, for International Application No. PCT/EP2019/078853, 3 pages.
NTT Docomo, Inc., "Enhancements on multi-TRP/panel transmission," R1-1811348, Agenda Item: 7.2.8.2, 3GPP TSG RAN WG1 Meeting #94bis, Chengdu, China, Oct. 8-12, 2018, 21 pages.

* cited by examiner

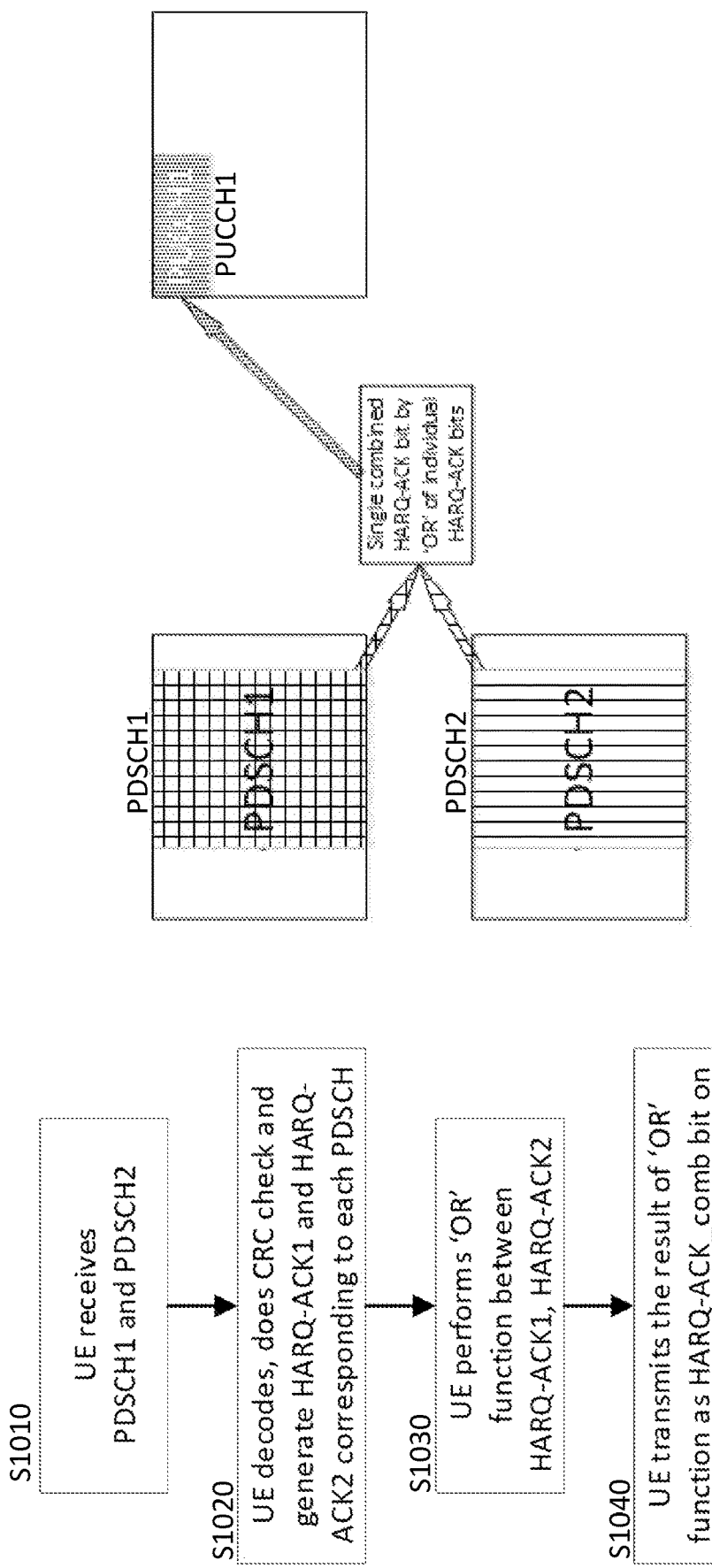

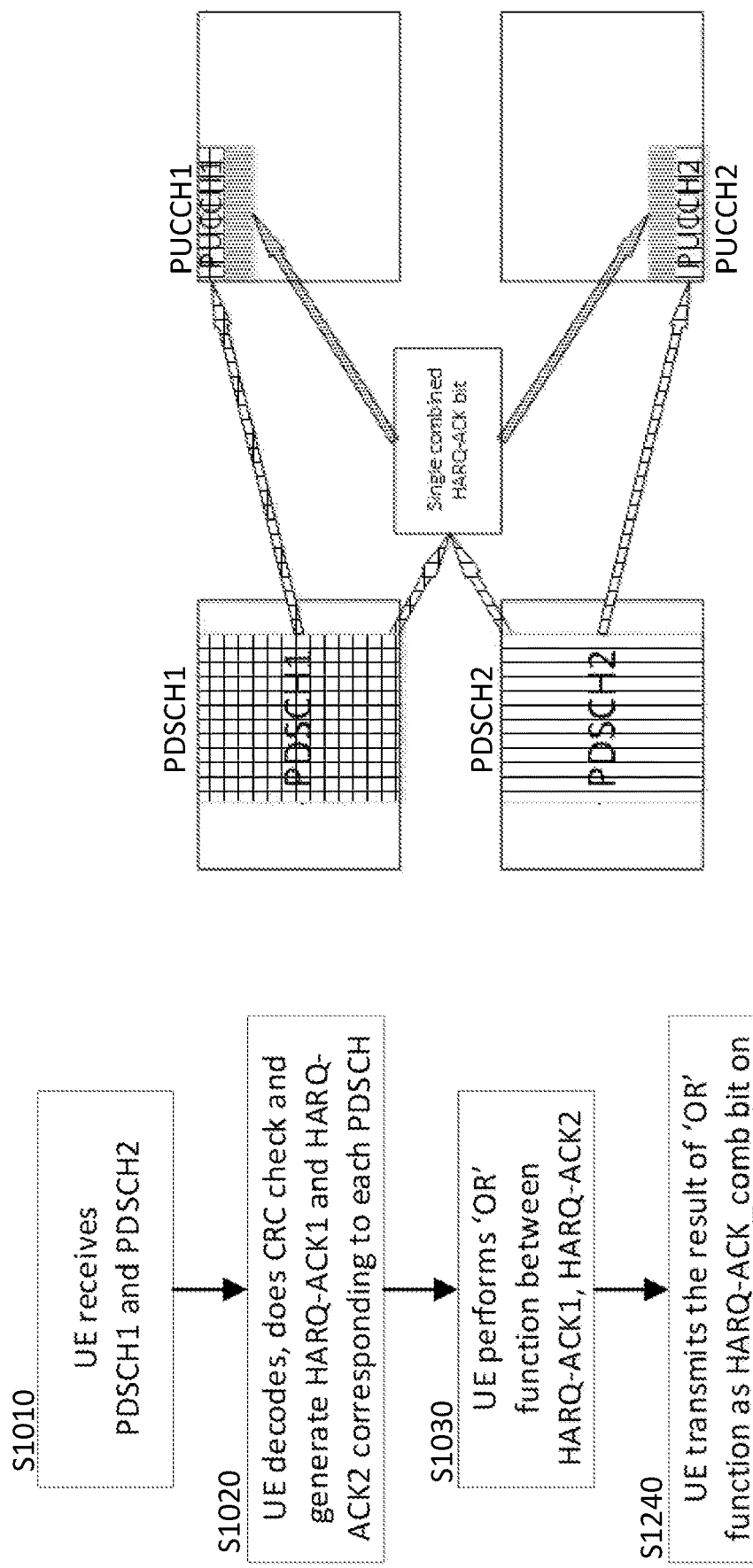

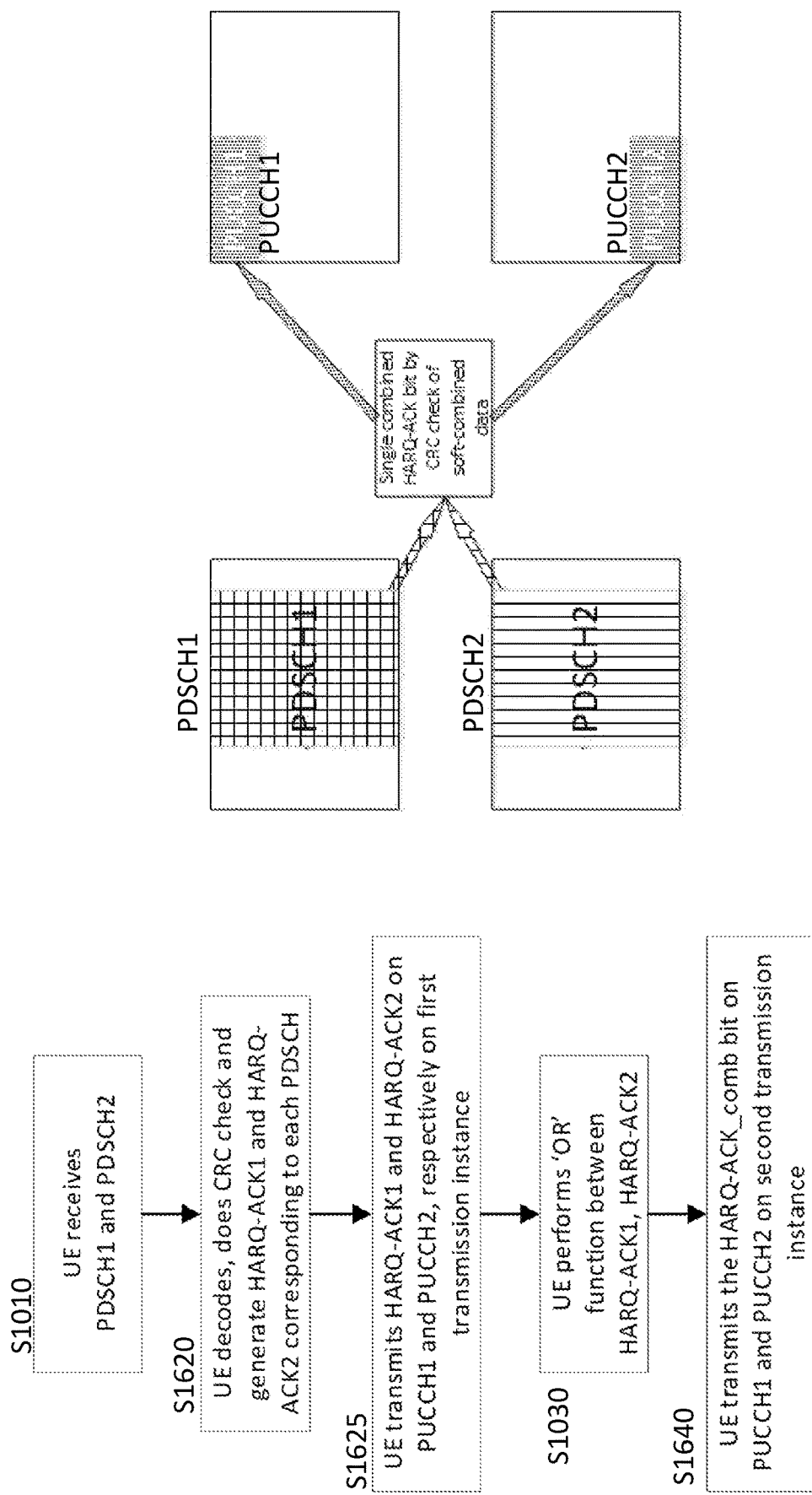

HARQ-ACK HANDLING WITH MULTIPLE PUCCH IN MULTI-TRP TRANSMISSION IN NR

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz. The NR is a follower of the technology represented by Long Term Evolution (LTE) and LTE Advanced (LTE-A). The NR is planned to facilitate providing a single technical framework addressing several usage scenarios, requirements and deployment scenarios defined including, for instance, enhanced mobile broadband (eMBB), ultra-reliable low-latency communications (URLLC), massive machine type communication (mMTC), and the like. For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include scenarios with large number of devices with non-time critical data transfers such as smart wearables and sensor networks. The services eMBB and URLLC are similar in that they both demand a very broad bandwidth, however are different in that the URLLC service requires ultra-low latencies. In NR, the Physical layer is based on time-frequency resources (such as Orthogonal Frequency Division Multiplexing, OFDM in LTE) and may support multiple antenna operation.

For systems like LTE and NR, further improvements and options may facilitating efficient operation of the communication system as well as particular devices pertaining to the system.

BRIEF SUMMARY

One non-limiting and exemplary embodiment facilitates providing robust and prompt signaling in communication using multiple transmission and reception points.

In one general aspect, the techniques disclosed herein feature a user equipment comprising a transceiver which, in operation, receives data on a plurality of downlink shared channels, the data received on the plurality of downlink shared channels being respectively the same data, and circuitry which, in operation, decodes the data, generates an indicator which indicates whether or not the data has been successfully decoded using the plurality of downlink shared channels, wherein the transceiver, in operation, transmits the indicator on at least one of a plurality of uplink control channels associated respectively with the plurality of downlink shared channels.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following, exemplary embodiments are described in more detail with reference to the attached figures and drawings.

FIG. 10 is a flow chart showing an exemplary embodiment of a gNB communication method;

FIG. 11 is a graph schematically illustrating transmission, reception and processing of PDSCHs and PUCCHs according to an exemplary embodiment;

FIG. 12 is a flow chart showing an exemplary embodiment of a gNB communication method;

FIG. 13 is a graph schematically illustrating transmission, reception and processing of PDSCHs and PUCCHs according to an exemplary embodiment;

FIG. 16 is a flow chart showing an exemplary embodiment of a gNB communication method;

FIG. 17 is a graph schematically illustrating transmission, reception and processing of PDSCHs and PUCCHs according to an exemplary embodiment;

DETAILED DESCRIPTION

Figure 1:
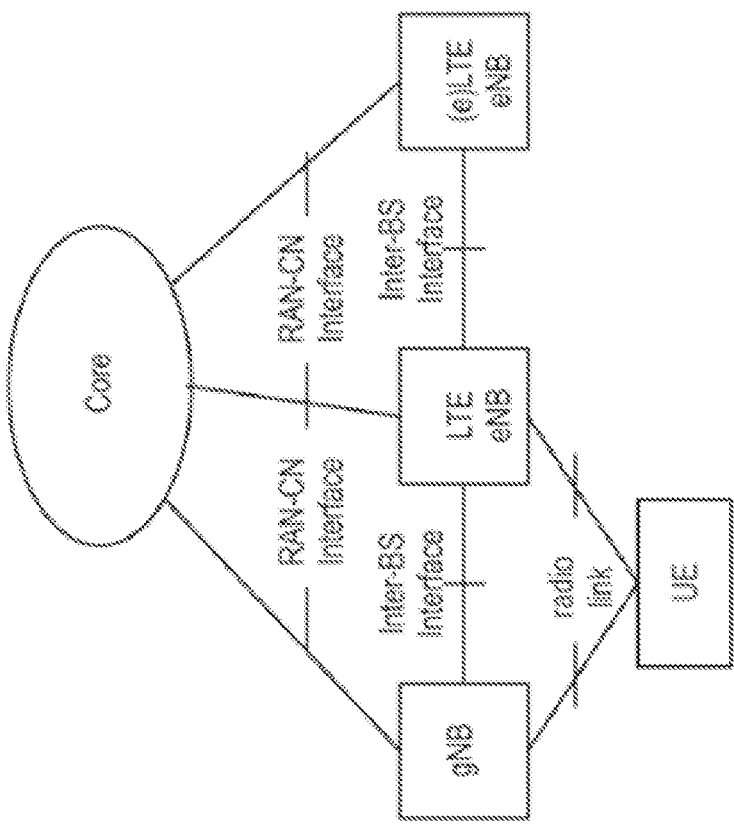
FIG. 1 shows an exemplary architecture for a 3GPP NR system including exemplary user and control plane architecture for the LTE eNB, gNB, and UE.

FIG. 1 shows an exemplary example of a communication system including a base station and a terminal and a core network. Such communication system may be a 3GPP system such as NR and/or LTE and/or UMTS. For example, as illustrated in FIG. 1, the base station (BS) may be a gNB (gNodeB, e.g., an NR gNB) or an eNB (eNodeB, e.g., an LTE gNB). However, the present disclosure is not limited to these 3GPP systems or to any other systems. Even though the embodiments and exemplary implementations are described using some terminology of 3GPP systems, the present disclosure is also applicable to any other communication systems, and in particular in any cellular, wireless and/or mobile systems.

A terminal is referred to in the LTE and NR as a user equipment (UE). This may be a mobile device such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station is a network node, e.g., forming a part of the network for providing services to terminals. A base station is a network node, which provides wireless access to terminals.

The physical layer in NR may provide multi-antenna operation such as MIMO (multiple input, multiple output) which may, for instance, include the use of plural or multiple transmission and reception points (multi-TRP). For instance, a user equipment may receive data from plural TRPs (transmission and reception points), wherein the plural-TRPs may be controlled by the same or different network nodes. The terms multi-point transmission or coordinated multi-point transmission (CoMP) may also be used for multi-TRP communication or transmission.

The technologies described in the present disclosure are not limited to a particular arrangement of TRPs, or a particular relationship between TRPs and gNBs. Accordingly, for instance, multi-TRP operation may be performed by a gNB having different antenna panels or radio heads corresponding to the TRPs and different radio frequency units operating with the respective antennas.

Moreover, in multi-TRP, several options are conceivable with respect to the positional relationship between TRPs, and the distance between two TRPs may vary. For instance, the TRPs may be close, so that a UE receives signals from these TRPs from a similar angle. However, TRPs may also be located at a rather far distance from each other, for instance at remote locations of a network cell. A UE being served by the two TRPs may receive and transmit the signaling from and to the respective TRPs on uncorrelated channels. Accordingly, gains in channel diversity may be optimally utilized.

For instance, multi-TRP may be categorized into two high-level categories. Namely, the distinction between the categories may be made with respect to the backhaul type of the backhaul link between two given TRPs. On the one hand, an ideal backhaul is a very high throughput and very low latency backhaul such as dedicated point-to-point connection using e.g., optical fiber. An ideal backhaul is assumed to allow for communication between the TRPs with approximately or almost 0 ms delay (e.g., for LTE-A, technical report 3GPP TR 36.932 V15.0.0 (2018-06) mentions in section 6.1.3 a one-way latency of less the 2.5 us wherein, however, propagation delay in the fiber/cable is not included). On the other hand, a non-ideal backhaul is a backhaul such as DSL, microwave, and other backhauls like relaying, and may for example involve finite (one-way) delays in the range of 2 ms or 5 ms for communication between the two given TRPs.

Apart from the categorization into ideal backhauls and non-ideal backhauls, a further categorization in multi-TRP MIMO technology may be made with respect to how baseband units are shared between TRPs. For instance, while there are different RF (radio frequency) blocks/units for each of two given TRPs, the TRPs may share the same the same baseband unit. Therein, the link between the RF units and the baseband unit may be ideal or non-ideal. Alternatively, there may be both different baseband and different RF blocks for each TRP. Therein, the respective links between baseband units and RF units as well as the link between the different baseband units may be ideal or non-ideal.

The present disclosure provides approaches which may facilitate multi-TRP operation and may particularly facilitate achieving reliability and robustness. The technologies disclosed may for instance facilitate satisfying the requirements of URLLC by utilizing multi-TRP communication, but are not limited to URLLC use cases. For instance, the technologies disclosed may also be applied to eMBB and mMTC use cases. The present disclosure is applicable to scenarios including one or both of ideal and non-ideal backhauls.

As mentioned above, multiple and far apart TRPs may allow for providing spatial diversity gains. The exploitation of these spatial diversity gains may in particular facilitate transmission and reception in a range of high frequencies where blockage for any of the links or wireless communication channels between a TRP and a UE is particularly possible. In view of this, the techniques disclosed herein may facilitate coordination between multiple points such as TRPs to schedule control channels and/or data channels.

Figure 2:
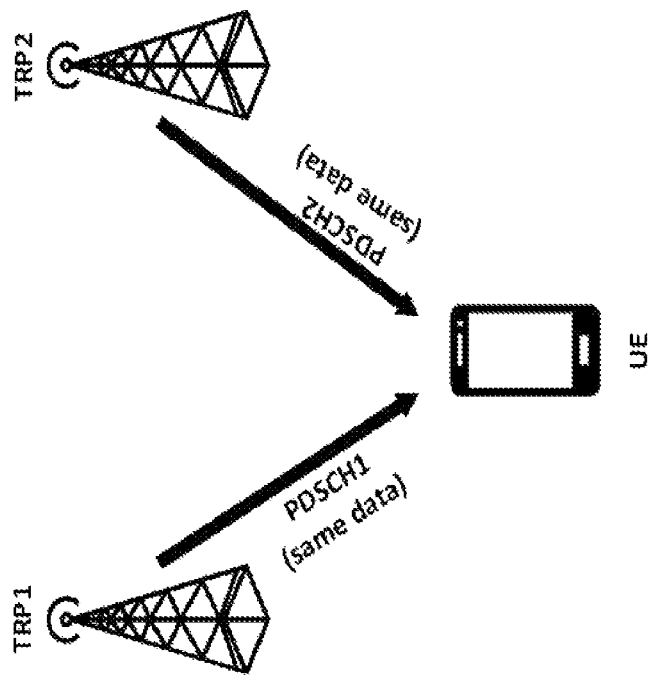
FIG. 2 is a schematic drawing showing an example PDSCH (physical downlink shared channel) data reception by a user equipment from plural transmission and reception points.

An exemplary use case of multi-TRP coordination is illustrated in FIG. 2. Plural TRPs transmit the same data on respective physical downlink shared channels (PDSCHs) to a UE. In FIG. 2, two TRPs, TRP1 and TRP2, are shown which respectively transmit the same data on respective physical downlink shared channels, PDSCH1 and PDSCH2. However, the present disclosure is not limited to scenarios where two TRPs transmit the same data to a UE. A plurality of TRPs transmitting the same data may comprise two as well as a larger number of TRPs transmitting respective PDSCHs. Accordingly, the present disclosure may be applied in use cases were each TRP transmits its respective own PDSCH, and the same data stream is used for the respective PDSCHs.

Moreover, two given PDSCHs among the plurality of PDSCHs respectively belonging to the plurality of TRPs may have the same or a respectively different MCS (modulation and coding scheme). Further, two given PDSCHs among the plurality of PDSCHs may have the same or a different redundancy version.

When in multi-TRP communication each TRP has a separate respective PDSCH, but the separate PDSCHs all use the same data stream and convey the same data, an issue arises of how to handle the HARQ-ACK (Hybrid Automatic Repeat Request-Acknowledgement) feedback.

Figure 4:
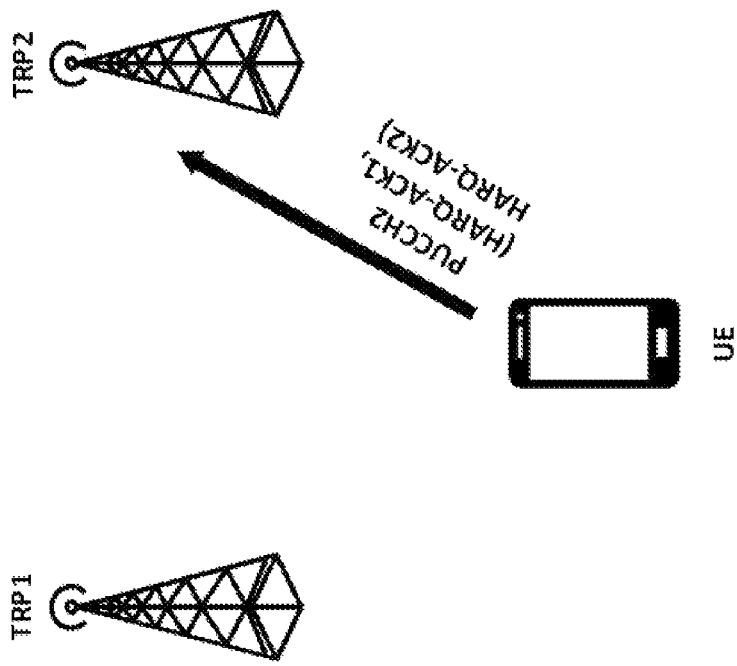
FIG. 4 is a schematic drawing showing another example of PUCCH (physical uplink control channel) ACK (acknowledgement) transmission by a user equipment in a plural-TRP arrangement.
Figure 3:
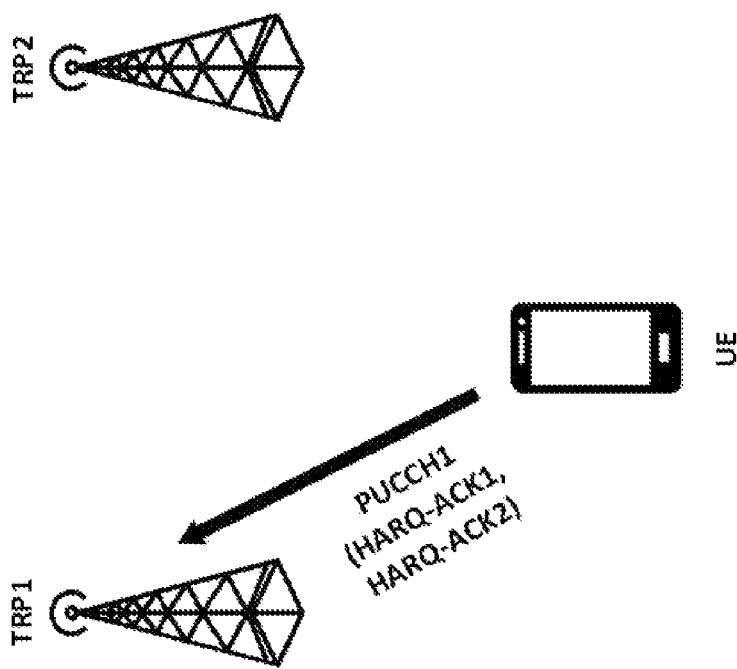
FIG. 3 is a schematic drawing showing an example of PUCCH (physical uplink control channel) ACK (acknowledgement) transmission by a user equipment in a plural-TRP arrangement.
Figure 5:
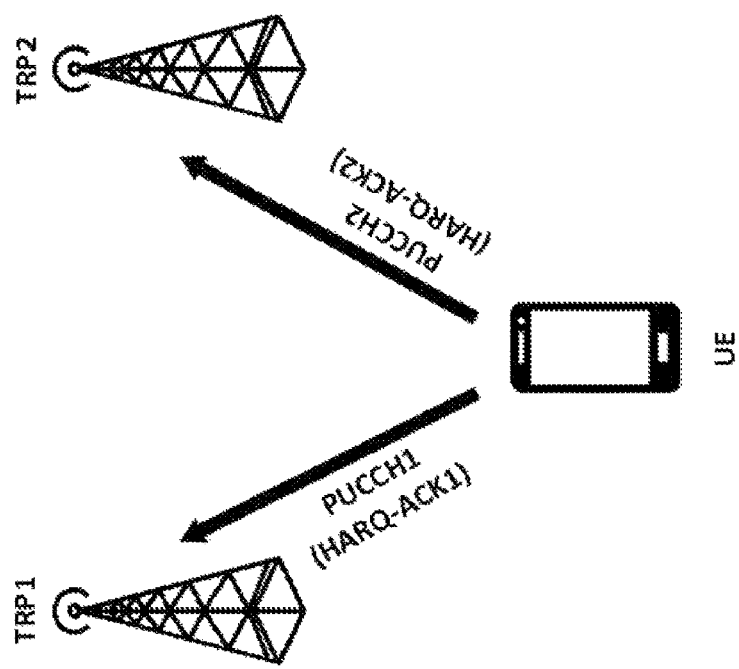
FIG. 5 is a schematic drawing showing a further example of PUCCH (physical uplink control channel) ACK (acknowledgement) transmission by a user equipment in a plural-TRP arrangement.

Some exemplary schemes of HARQ-ACK handling are shown in FIGS. 3 to 5. Therein PUCCH1 is the uplink control channel on which the UE transmits control data such as a HARQ-ACK feedback to TRP1, and PUCCH2 is the control channel for uplink control transmissions from the UE to TRP2. HARQ-ACK1 is the HARQ-ACK feedback to PDSCH1 shown in FIG. 2, and HARQ-ACK2 is the HARQ-ACK feedback to PDSCH2.

However, as will be described in the following, transmission/reception schemes for physical control channels (PDCCH/PUCCH), such as exemplified by FIGS. 3 to 5, might not optimally utilize and exploit the benefits of multi-TRP transmission.

In FIGS. 3 and 4, a single PUCCH (PUCCH1 in FIG. 3 and PUCCH2 in FIG. 2) carries both feedback signals HARQ-ACK1 and HARQ-ACK2. Such a single-PUCCH transmission may face robustness issues since the used link (the link from UE to TRP1 in FIG. 3, and the link from the UE to TRP2 in FIG. 4) may be in blockage. Furthermore, the non-served TRP (TRP2 in FIG. 3 and TRP1 in FIG. 4) needs to be informed about the HARQ-ACK to its respective PDSCH, which may lead to an increased latency, in particular if there is a non-ideal backhaul between TRP1 and TRP2.

The UE may also transmit respective PUCCHs with respective HARQ-ACK signals to the plural TRPs. For instance, in FIG. 5, the UE sends PUCCH1 to TRP1, and respectively sends PUCCH2 to TRP2. However, in the case of a NACK (negative acknowledgement) which the UE transmits in a PUCCH in response to a respective PDSCH from which it could not successfully receive and/or decode the data, an unnecessary retransmission from one of the TRPs which receives the NACK may occur if the other TRP (or at least one of the other TRPs in a case of more than two TRPs) received a (positive ACK) indicating that the data on its respective PDSCH could be successfully received and decoded. Since the data stream is the same for both (or all) PDSCH, and the same data is conveyed on the PDSCHs, the correct reception and decoding of one of the plural PDSCHs from one of the respective plural TRPs is sufficient. In particular, a TRP which received the NACK might not receive backhaul control signaling or receive it with some delay in case of non-ideal backhaul from another TRP that received an ACK. Delayed reception or no reception of the ACK from the other TRP may result in an unnecessary retransmission.

Figure 6:
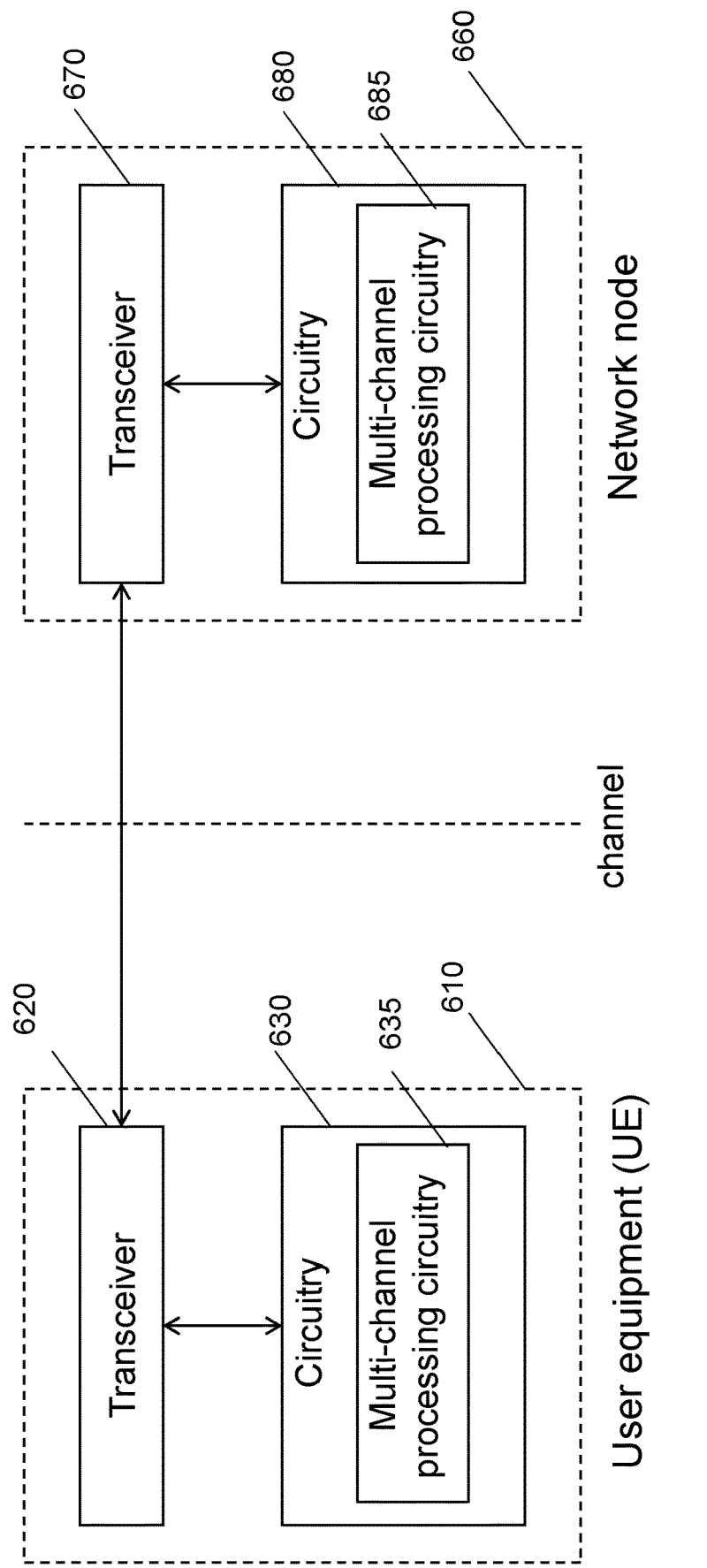
FIG. 6 is a block diagram showing an exemplary structure of a user equipment and a network node.

The present disclosure provides a user equipment (UE) 610 comprising a transceiver 620 (transceiver/receiver) and circuitry 630. An exemplary UE in accordance with the present disclosure is illustrated in FIG. 6.

As can be seen from FIG. 6, the present disclosure also provides a network node 660 to be further described below. UE and network node are connected to and in communication with each other via a channel, for instance a wireless channel, in a communication system. Moreover, the UE may be in connection with one or more network nodes over respective wireless channels, wherein, in the case of more than one network node, the network nodes are further in connection with each other via a (non-ideal or ideal) backhaul link.

In order to distinguish transceiver 620 and circuitry 630 comprised by the UE 610 from a transceiver 670 and circuitry 680 comprised by the network node, the terms "UE transceiver," "UE circuitry," "network node transceiver" and "network node circuitry" are also respectively used in the description.

The UE transceiver 620, in operation, receives data on a plurality of downlink shared channels. The data (e.g., user data or higher-layer data from a layer higher than the physical layer) received respectively on the plurality of downlink shared channels is the same data; for instance, the data has been generated using the same data stream.

Figure 7:
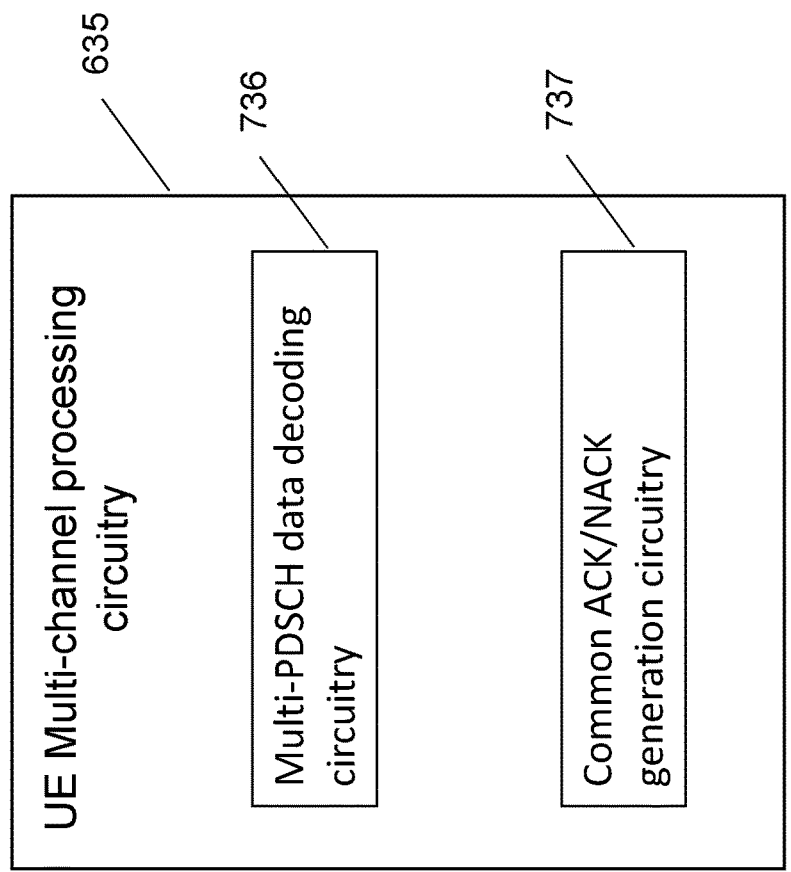
FIG. 7 is a block diagram showing an exemplary structure of a circuitry of a user equipment.

The UE circuitry 630 is processing circuitry which, in operation, decodes the data and generates an indicator which indicates whether or not the data has been successfully decoded using the plurality of downlink shared channels. For instance, the UE circuitry 630 comprises multi-channel processing circuitry 635 (or plural-channel processing circuitry). For instance, the multi-channel processing circuitry 635, which is exemplified by FIG. 7, comprises multi-channel data decoding circuitry 736 (e.g., multi-PDSCH data decoding circuitry) and decoding result indicator generation circuitry 737 (e.g., common ACK/NACK generation circuitry).

The UE transceiver 620, in operation, transmits the indicator generated by the UE circuitry 630 on at least one of a plurality of uplink control channels. Therein, the plurality of uplink control channels are associated respectively with the plurality of downlink shared channels.

For instance, the plurality of downlink channels and the respectively corresponding plurality of uplink control channels are PDSCHs and PUCCHs, as used in LTE, LTE-A, or NR, used to transmit identical data using a plurality of HARQ processes which may respectively include an initial transmission and, if necessary, one or more retransmissions. A PUCCH associated with a respective PDSCH carries a HARQ-ACK signal (ACK or NACK) indicating whether or not the data has been successfully decoded. Although the PUCCH responds to a respective PDSCH (e.g., PUCCH1 associated with PDSCH1, PUCCH2 associated with PDSCH2, etc.), the indicator included in the HARQ-ACK signal indicates successful decoding using the plurality of PDSCHs rather indicating the result obtained using only the respective PDSCH.

The plurality of PDSCHs may be transmitted by one or more network nodes in the same transmission time interval (TTI), and may further be received using the same frequency, frequencies or bandwidth part. Moreover, the plurality of PUCCHs may be transmitted in the same TTI. Accordingly, when referring to a plurality of PDSCHs/PUCCHs, the present disclosure does not refer a plurality of (re)transmissions within a single HARQ process, but describes a plurality of HARQ processes by which transmission of identical data is performed. As will be described further below, a plurality of interrelated or linked HARQ processes for the transmission of the same data may be considered to constitute a multi-TRP HARQ process.

However, the plurality of PDSCHs may differ in the spatial directions from which they are transmitted to/received by the UE, and/or respective beams on which they are sent. Further, depending on the embodiment, as described further below, the MCS and/or redundancy versions used for encoding and transmitting the data in two given HARQ processes among the plurality of HARQ processes may be the same or different.

Corresponding to the above-mentioned UE and the network node, the present application further provides a communication method for a UE and a communication method for a network node.

Figure 8:
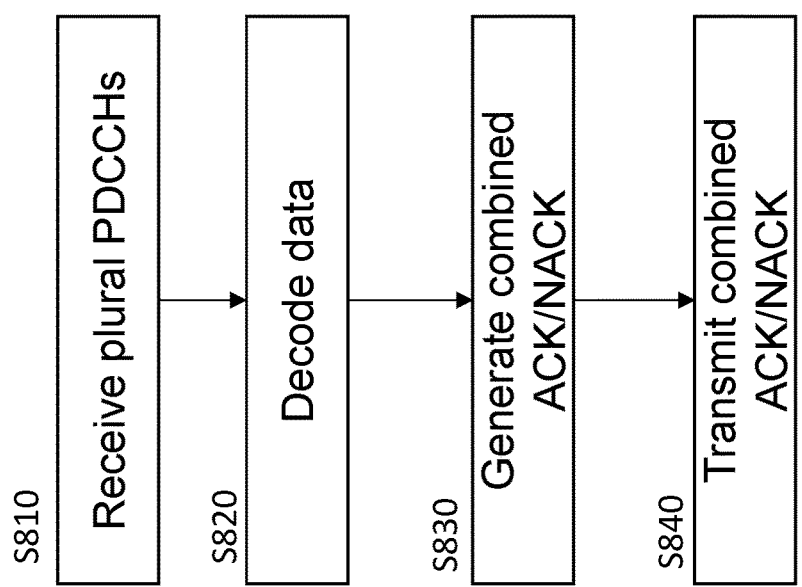
FIG. 8 is a flow chart showing an exemplary gNB communication method.

The communication method for a UE, as shown in FIG. 8, comprises the step of receiving S810 data on a plurality of downlink shared channels, wherein the data received on the plurality of downlink shared channels is respectively the same data. The method further comprises the steps of decoding S820 the data and generating S830 an indicator which indicates whether or not the data has been successfully decoded using the plurality of downlink shared channels. Moreover, the method comprises a step of transmitting S840 the indicator on at least one of a plurality of uplink control channels associated respectively with the plurality of downlink shared channels.

When, in accordance with the above description of apparatuses (UE and network node) and corresponding methods, the UE 610 receives separate PDSCHs from among a plurality of PDSCHs from each of a plurality of TRPs (e.g., PDSCH1 from TRP1 and PDSCH2 from TRP2), the UE sends back a common (e.g., a combined) HARQ-ACK result (for instance a common or combined HARQ-ACK result bit) to one, more, or each TRP from among the plurality of TRPs using respectively one or more separate PUCCHs, such as PUCCH1 (to TRP1) and PUCCH2 (to TRP2).

Accordingly, techniques disclosed herein may facilitate providing robustness as they provide for HARQ-ACK information to be received at least by one TRP while one or more of the remaining TRPs is/are in blockage. Moreover, the present invention may facilitate reducing backhaul latency in the exchange of the HARQ-ACK information between the plurality of TRPs, as the plural TRPs will receive the same (i.e., common ACK/NACK) information.

In the following, several exemplary embodiments of the present disclosure will be described.

For instance, the UE transceiver 620, in operation, transmits the indicator on each of the plurality of uplink control channels associated respectively with the plurality of uplink control channels. A first example is shown in FIG. 9.

Figure 9:
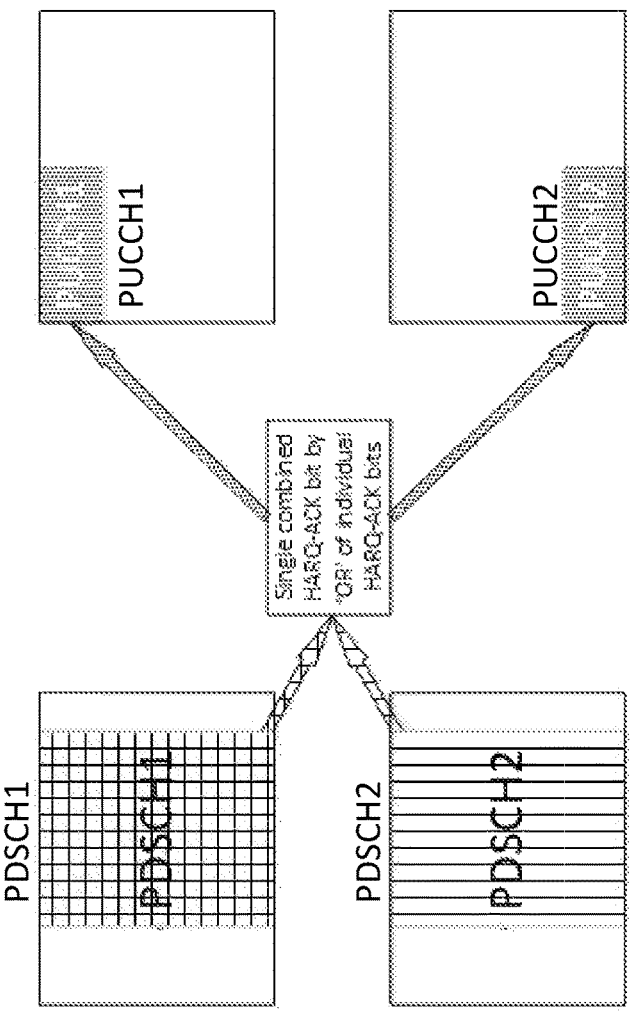
FIG. 9 is a graph schematically illustrating transmission, reception and processing of PDSCHs and PUCCHs according to an exemplary embodiment.

In FIG. 9 (as well as FIGS. 11, 13, 15, and 17), the respective downlink shared channels and uplink control channels are shown as hatched portions embedded in rectangular shapes. The rectangular shapes represent temporal units such as TTIs in which the transmission of the respective physical channel is performed, e.g., slots or temporal units below the slot level, depending on whether slot-based or non-slot-based communication is performed and on the particular numerology defining subcarrier spacing of the physical, in particular time (symbol) and frequency resources, resources. However, the depicted arrangement of hatched portions within rectangles is merely schematic and not intended to limit the present disclosure to any particular allocation of physical channels to particular physical resources within a TTI. Moreover, a rectangle may also represent temporal resources including a plurality of TTIs. Moreover, the respective channel names have been reproduced adjacent to the hatched portions to enhance readability.

In general, TTI determines the timing granularity for scheduling assignment. One TTI is the time interval in which given signals is mapped to the physical layer. For instance, conventionally, the TTI length can vary from 14-symbols (slot-based scheduling) to 2-symbols (non-slot based scheduling). Downlink and uplink transmissions are specified to be organized into frames (10 ms duration) consisting of 10 subframes (1 ms duration). In slot-based transmission, a subframe, in return, is divided into slots, the number of slots being defined by the numerology/subcarrier spacing and the specified values range between 10 slots for a subcarrier spacing of 15 kHz to 320 slots for a subcarrier spacing of 240 kHz. The number of OFDM symbols per slot is 14 for normal cyclic prefix and 12 for extended cyclic prefix (see section 4.1 (general frame structure), 4.2 (Numerologies), 4.3.1 (frames and subframes) and 4.3.2 (slots) of the 3GPP TS 38.211 V15.0.0 (2017-12)). However, assignment of time resources for transmission may also be non-slot based. In particular, the TTIs in non slot-based assignment may correspond to mini-slots rather than slots. I.e., one or more mini-slots may be assign to a requested transmission of data/control signaling. In non slot-based assignment, the minimum length of a TTI may conventionally be 2 OFDM symbols.

In several exemplary embodiments, the UE transceiver 620, in operation receives the plurality of downlink shared channels respectively from a plurality (two or more) of TRPs, such as TRP1 and TRP2 shown in FIG. 2. In some of these embodiments, the UE transceiver 620 transmits the indicator on each of the plurality of uplink control channels respectively to the plurality of TRPs. Accordingly, a downlink shared channel and a corresponding uplink control channel are received from/transmitted to the same TRP. In these cases, an uplink channel and a downlink channel associated with the uplink channel are links between a UE and the same TRP.

It should be noted that although the disclosure provides some examples of a scenario with two TRPs, the above and following embodiments are directly and analogously applicable to multi-TRP scenarios using more than two TRPs.

Furthermore, as mentioned above, the respective downlink shared channels (e.g., PDSCHs) transmit the same data using the same data stream. Accordingly, it is required that this same data is available to each of the plurality of TRPs, for instance made available between the TRPs by a backhaul link. In an exemplary, non-limiting scenario, the respective TRPs have the same baseband unit but respectively different RF blocks for each of the plurality of TRPs. In this scenario, the link between the plurality of RF units to the baseband unit may be non-ideal. However, since this exemplary scenario is non-limiting, the previous and the following embodiments may also be applied to any other combinations of single and multiple baseband units connected to each other and to the respective RF units by ideal or non-ideal backhaul links, if no indication to the contrary is made and/or the context does not indicate the contrary.

In some embodiments, the indicator generated and transmitted by the UE is a common or combined indicator which indicates a common result of decoding using at least two downlink shared channels among the plurality of downlink shared channels. In particular, the common indicator is a one-bit indicator. Moreover, the common result may be a result which is based on each of the plurality of downlink shared channels.

Accordingly, a single HARQ-ACK bit (i.e., the common indicator or combined indicator) indicates successful decoding based on a processing performed by the UE circuitry 630 on a plurality of instances of the same data included respectively in the plurality of downlink shared channels. For instance, the data from the plurality of downlink shared channels may be combined to generate a single combined code word before the decoding is performed. Alternatively, the plurality of instances of the data from the respective PDSCHs may first be processed separately, and then a single combined HARQ-ACK bit is generated based on the plurality of decoding results.

Combining of Decoding Results

In some embodiments, as shown in FIG. 9, the UE circuitry 630, in operation, respectively (individually) decodes the code words corresponding to and representing the same data respectively in the plurality of PDSCHs determines whether the decoding of each of the respective code words from the plurality of PDSCHs has been successful. For instance, the UE circuitry performs CRCs (cyclic redundancy check) respectively on the decoded data to determine whether decoding has been successful. Based on the results of the respective checks, the UE circuitry 630 generates respective indicators (e.g., one-bit indicators) indicating the respective results of the CRCs. Based on the respective indicators or on the individual results of decoding and CRC using checking the respective PDSCHs, the UE circuitry generates the common indicator.

For instance, the processing circuitry respectively decodes the plurality of downlink shared channels, performs a logical (or binary) "OR" operation on the respective results of the decoding of the plurality of downlink shared channels. The common indicator is a one-bit indicator indicating the respective results of the logical "OR" operation. Each PDSCH from among the plurality of PDSCHs (transmitted respectively from the plurality of TRPs) is individually decoded by the UE circuitry 630, and the individual HARQ-ACK results or bits from the respectively performed CRCs are combined by applying a logical "OR" function on the respective bits to generate the common indicator as single bit. The single bit (i.e., the value indicating the result of the logical "OR" operation) may be transmitted on each of the plurality of PUCCHs to the respective TRPs from among the plurality of TRPs.

The present disclosure is not limited to any particular implementation of a logical "OR" function/operation. It is sufficient that an operation is performed which determines whether or not the data has been successfully received and decoded by individual processing (decoding and CRC) of the data from at least one of the plurality of PDSCHs. A combined HARQ-ACK bit having a (positive) ACK value is generated at least one of the individual decoding processes has been successful, and a combined HARQ-ACK bit having a value representing a NACK is generated none of the individual decoding processes using the respective PDSCHs was successful.

For instance, in the case of two PDSCHs shown in FIG. 9, a combined HARQ-ACK result bit is generated by performing a logical "OR" function between individual respective HARQ-ACK bits, HARQ-ACK1 and HARQ-ACK 2 with respect to the corresponding downlink shared channels, PDSCH1 and PDSCH2, respectively.

FIG. 10 shows an exemplary embodiment of a communication method for a UE according to some embodiments wherein a logical "OR" function is performed. In the receiving step S1010, the UE receives the same data in PDSCH1 and PDSCH 2. Step S1020 includes individual decoding using the respective PDSCHs, respectively performing CRCs and generating respective HARQ-ACK indicators HARQ-ACK1 and HARQ-ACK2 corresponding respectively to the plurality of PDSCHs. An "OR" function is performed in step S1030 to generate a combined HARQ-ACK bit (which may e.g., be named "HARQ-ACK_comb") representing the common result of decoding the data using the plurality of PDSCHs. The method shown in FIG. 10 further comprises, as a transmission step S1040, transmitting the result of the application of the "OR" function as the combined HARQ-ACK bit on each of the respective PUCCHs associated with the respective PDSCHs.

The embodiments of the present disclosure in which a logical "OR" operation is applied on individual decoding results of PDSCHs may facilitate providing transmission efficiency because even if one PDSCH among the plurality of PDSCHs is correctly decoded, no retransmission from any of the plurality of TRPs needs to be performed. In addition, these embodiments may be utilized when different MCS (or different redundancy versions) are utilized respectively on different PDSCHs.

The present disclosure may facilitate exploiting spatial diversity by using respective downlink shared channels from a plurality of TRPs and by transmitting the same common indicator on a plurality of uplink control channels to the respective PDSCHs. However, in some cases, it may be sufficient if the combined indicator is sent on one PUCCH to one of the plurality of TRPs. Still, as shown in FIGS. 9 and 10 described above, each of the plurality of PDSCHs from the respective TRPs is individually decoded at the UE, and the HARQ-ACK results of each CRC performed on a respective decoding result of the plurality of PDSCHs is combined using the above-mentioned logical "OR" function. However, as shown in FIG. 11, the single bit resulting from the logical "OR" operation S1030 is transmitted on PUCCH1 only.

For instance, as shown in FIG. 12 steps S1010 to S1030 are the same as in the method illustrated FIG. 10. However, in the transmission step S1240, the UE transmits the combined HARQ-ACK bit resulting from the logical "OR" operation on PUCCH1 only.

In particular, if the uplink channel quality between UE and TRP2 is poor in comparison with the channel quality on the uplink between the UE and TRP1, it may be unnecessary to transmit the common indicator to TRP2. Moreover, an ideal backhaul link between the respective TRPs may facilitate compensating the omitted PUCCH transmission to TRP2. Also, in the case of a wide beam and two TRPs located relatively close to each other, a single PUCCH transmission may be sufficient for being received at both TRPs.

Furthermore, in some exemplary embodiments where the combined indicator is sent on each of the plurality of uplink control channels, a respective indicators may be transmitted on each of the corresponding uplink control channel as well.

For instance, the UE circuitry 630, in operation, generates for each of the plurality of downlink shared channels, a respective indicator indicating whether or not the data has been successfully decoded using the respective downlink shared channel. The UE transceiver 620, in operation, transmits, on each of the plurality of uplink control channels, the common indicator (the combined HARQ-ACK bit described above) and the respective indicator indicating the result of decoding the downlink shared channel associated respectively with the uplink control channel. Accordingly, in addition to the combined one-bit HARQ-ACK indicator, a respective single-channel or individual HARQ-ACK indicator (e.g., respective bits HARQ-ACK1 and HARQ-ACK2) is transmitted respectively on each of the plurality of uplink control channels (e.g., PUCCH1 and PUCCH2) to the respective TRPs.

The transmission of a plurality of individual HARQ-ACK bits on respective PUCCHs may be useful from the point of view of channel quality indication as well as link adaptation and/or dynamic point selection. For instance, when a NACK indicated by an individual HARQ-ACK indicator received by one of the TRPs, a TRP different from this TRP receiving the NACK may be selected for performing subsequent PDSCH transmissions as one of the plurality of TRPs to replace the TRP that has received the NACK in later TTIs.

In some exemplary embodiments, the UE transceiver, in operation, transmits, on each of the plurality of uplink control channels, an ACK/NACK signal including the common (combined) indicator generated based on the logical "OR" operation and the respective individual indicator indicating successful or unsuccessful decoding of the data transmitted on the respective PDSCH from the respective TRP. Accordingly, a plurality of ACK/NACK signals transmitted respectively on the plurality of PUCCHs each contain two HARQ-ACK bits, namely a common indicator (one-bit indicator) and a respective indicator which may be a one-bit indicator as well.

Figure 14:
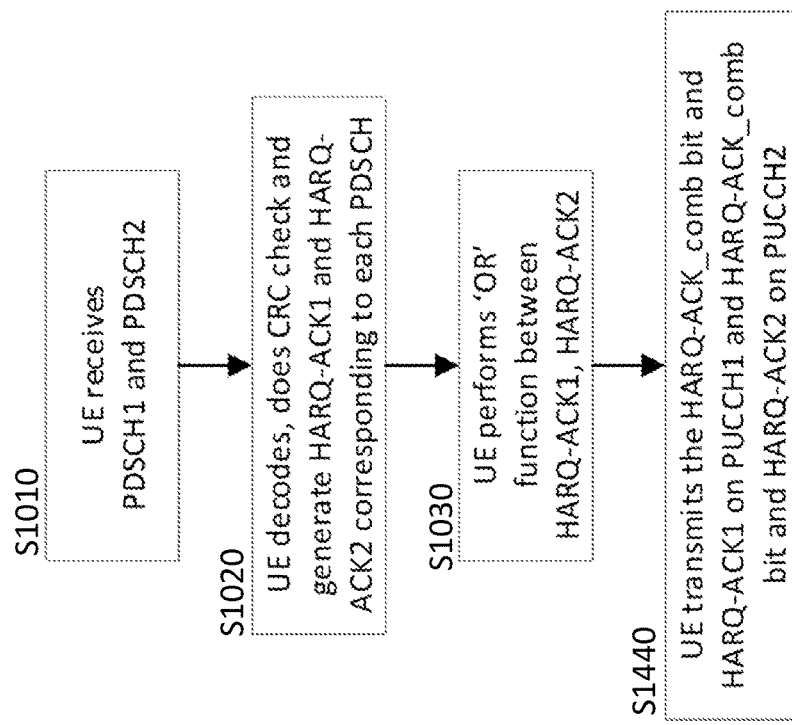
FIG. 14 is a flow chart showing an exemplary embodiment of a gNB communication method.

The generation and transmission of individual respective indicators in addition to the single combined HARQ-ACK bit is schematically illustrated in FIG. 13 by additional arrows between the respective PDSCHs and PUCCHs which are added with respect to FIG. 9. A communication method for a UE transmitting a plurality of respective individual indicator in addition to the individual indicator is shown in FIG. 14. In the method, transmission step 1440 differs from step 1040 shown in FIG. 10 in that the UE transmits the combined indicator and the individual indicator HARQ-ACK1 on PUCCH1 and by transmitting the combined bit and the individual HARQ-ACK2 indicator on PUCCH2 rather than transmitting only the combined indicator on both PUCCHs.

However, for the case where a respective bit on each of the plurality of PUCCHs is provided in addition to the common one-bit indicator, the present disclosure is not limited to the respective indicator and the common indicator being signaled within a single signal (HARQ-ACK signal) or simultaneously in the same transmission instance. In particular, the respective indicators may already be signaled before the generation of the common indicator has been accomplished.

Accordingly, in some embodiments, the UE transceiver 620, in operation, transmits the respective indicator on each of the plurality of uplink control channels before the UE circuitry performs or accomplished performing the logical "OR" operation or the generation of the common indicator.

Figure 15:
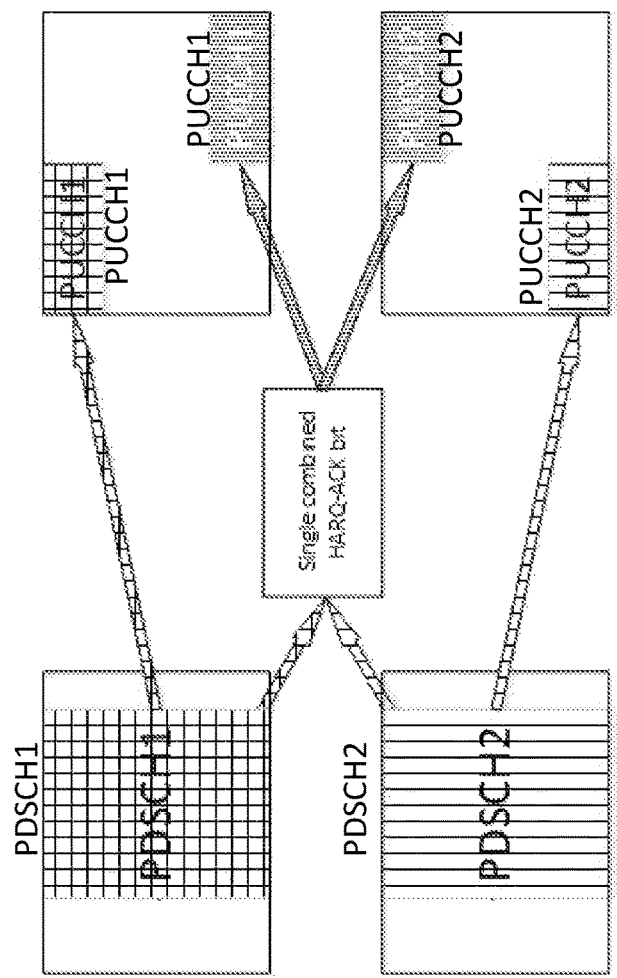
FIG. 15 is a graph schematically illustrating transmission, reception and processing of PDSCHs and PUCCHs according to an exemplary embodiment.

This is shown in FIG. 15 where an example of two downlink shared channels, PDSCH1 and PDSCH2 and respective corresponding uplink control channels, PUCCH1 and PUCCH2, are shown. As can be seen, there are two instances of each of the two uplink control channels. These two instances of the same uplink control channel symbolize that the individual (respective) HARQ-ACK indicators are signaled at different time instances or transmission instances than the common HARQ-ACK indicators. For instance, on each of the plurality of PUCCHs, the common indicator may be signaled in the TTI adjacently subsequent to the TTI where the individual HARQ-ACK indicator is transmitted. However, dependent on the latency requirements of a particular use case, there may be one or more TTIs between the TTIs in which the individual and respectively, the common indicator is transmitted. As another example, the respective and the common indicator are transmitted on the same TTI, wherein they may be transmitted on respectively different PUCCHs which are both associated with the respective PDSCH. Moreover, the drawing of FIG. 15 is merely schematic, and the present disclosure is not limiting with respect to whether the individual and the common indicator in the same PUCCH are transmitted using the same or different frequencies/bandwidths.

First, the individual respective indicators or HARQ-ACK indicators corresponding respectively to one of the plurality of PDSCHs are respectively transmitted on plurality of PUCCHs.

Second, the combined HARQ-ACK bit, e.g., the result of the logical "OR" operation, is sent on each PUCCH.

An exemplary embodiment of a communication method for a UE for separately transmitting the individual and the combined HARQ-ACK indicator is shown in FIG. 16. In contrast to communication methods of previous embodiments, a transmission step S1625 is included where the HARQ-ACK1 and the HARQ-ACK2 (the respective indicators) are transmitted respectively on PUCCH1 and PUCCH2 on a first time instance. In a further transmission step S1640, the common indicator (the combined HARQ-ACK bit) is transmitted on both PUCCH1 and PUCCH2 (or, more generally, each of the plurality of PUCCHs) on second transmission instance.

As indicated with respect to the embodiments described above with respect to FIGS. 14 and 15, the individual HARQ-ACK bits may facilitate channel quality indication/estimation, radio link adaptation and/or dynamic point (TRP) selection. However, in the currently described embodiments, the combined HARQ-ACK bit is transmitted later than the respective individual HARQ-ACK bits as its generation might be delayed with respect to the individual respective decoding and CRC processes. Moreover, a faster or timelier transmission of the individual HARQ-ACK bits may be facilitated.

In the embodiments described above, the common indicator is a one-bit indicator which is generated by performing an operation such as a logical "OR" on the respective decoding/CRC results of the PDSCH data. However, as an alternative to generating such a common indicator, the present application also provides embodiments in which the common indicator includes a plurality of bits respectively representing decoding success of the plurality of PDSCHs.

Accordingly, in some embodiments, the common indicator includes a plurality of bits each of which indicates whether or not the data has been successfully decoded using a respective one of the plurality of downlink shared channels.

For instance, in a scenario with two TRPs respectively transmitting PDSCHs, a value "10" may indicate that the data has been successfully decoded from PDSCH1 and not successfully decoded from PDSCH2.

The present embodiments with a common indicator including plural bits may facilitate reducing the processing performed by a UE since a logical operation such as a binary "OR" function need not be performed to generate the common indicator. In particular, such embodiments may facilitate HARQ-ACK processes when the number of TRPs (PUCCHs) is not too large, for instance if there are two TRPs actively transmitting the data. However, for large numbers of TRPs transmitting the same data to the UE on respective PDSCHs, any of the aforementioned embodiments using the one-bit indicator may facilitate keeping the signaling overhead smaller.

Combining of Received Data

According to some embodiments described above, the decoding (and CRC) has been separately performed using the plurality of PDSCHs, and a common one-bit indicator has been based on processing, e.g., a logical "OR" operation, on the individual decoding results.

However, the data received on the respective PDSCHs may be combined (e.g., by applying soft-combining) rather than the decoding results, and the decoding and CRC is performed on the combined data/code word. The combined HARQ-ACK bit/common indicator is generated by soft-combining the signals received respectively from each TRP, and by performing a single CRC check.

According to some embodiments, the UE circuitry 630, in operation, performs soft-combining on the data received on the plurality of downlink shared channels, decodes the combined data obtained by the soft-combining, and generates the indicator based on the result of the decoding of the combined data.

When soft-combining is applied, the respective instances of the same data from the plurality of PDSCHs, e.g., a plurality of code words or data packets, may for instance be combined either on a bit-by bit basis or on a (OFDM) symbol-by-symbol basis. In order for soft-combining to be applied, the respective data packets received on the plurality of PDSCHs have the same number of bits/symbols. Accordingly, embodiments using soft-combining are utilized when the same MCS is used for the plurality of PDSCHs, e.g., PDSCH1 and PDSCH2.

The data received on a plurality of PDSCHs respectively from a plurality of TRPs is soft-combined by the UE, a combined CRC is generated, and the result of the combined CRC is transmitted to each of the plurality of PDSCHs. Accordingly, as shown in FIG. 17, a single combined HARQ-ACK bit (the common indicator which is a one-bit indicator as in some above-described embodiments) is generated by performing a CRC of soft-combined data.

Figure 18:
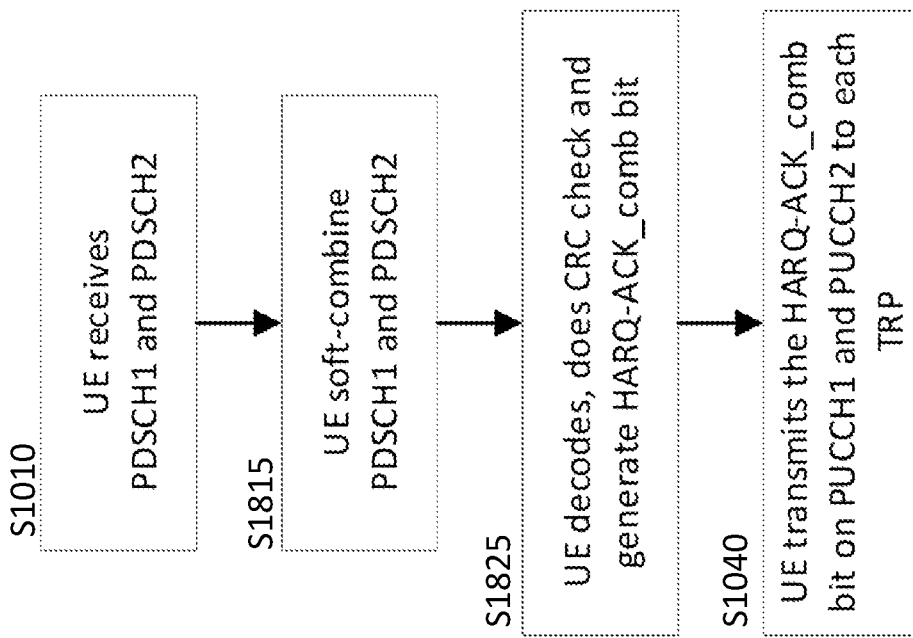
FIG. 18 is a flow chart showing an exemplary embodiment of a gNB communication method.

A communication method according to some embodiments is shown in FIG. 18, which includes a soft-combining step S1815 of soft-combining the data received on the plurality of PDSCHs, e.g., PDSCHs and PDSCH2. In the decoding step S1825, the UE circuitry 630 decodes the combined data, performs a CRC on the decoded data, and generates the common indicator which indicates whether or not the combined data has been successfully decoded.

In addition to soft-combining the data from the plurality of PDSCHs, if the transmissions is a retransmissions a plurality of HARQ-ACK processes, the combined codeword may further be soft-combined with a code word obtained in one or more previous transmissions.

The embodiments which apply soft-combining provide a single bit of HARQ-ACK information without previously generating respective HARQ-ACK bits. They may facilitate making the HARQ-ACK information available at each of the plurality of TRPs transmitting the PDSCHs without need for an ideal backhaul.

As mentioned above and shown in FIG. 6, in relation with any of the previous embodiments, the present disclosure provides a network node 660, e.g., a NR base station/gNB, comprising a transceiver 670 and circuitry 680. The network node transceiver 670, in operation, transmits data on a downlink shared channel from among a plurality of downlink shared channels. The data transmitted on the plurality of downlink shared channels is respectively the same data (e.g., the same data stream is used). On an uplink control channel associated with the downlink shared channel, the network node transceiver 670, in operation, receives an indicator which indicates whether or not the transmitted data has successfully been received and decoded using the plurality of downlink shared channels. The network node circuitry 680, in operation, determines based on the indicator, whether or not the d data has been successfully received and decoded. For instance, the network node circuitry 680 comprises multi-channel processing circuitry 685 which, in operation, determines whether the data has been successfully decoded using at least one of the plural or multiple downlink shared channels.

Corresponding to the network node 660, the present disclosure further provides a communication method for a network node. The network node communication method comprises a step of transmitting data on a downlink shared channel from among a plurality of downlink shared channels. The data transmitted on the plurality of downlink shared channels is respectively the same data. The method further comprises a receiving step of receiving, on an uplink control channel associated with the downlink shared channel, an indicator which indicates whether or not the transmitted data has successfully been received and decoded using the plurality of downlink shared channels, and a step of determining, based on the received indicator, whether or not the data has been successfully received and decoded.

For instance, the network node transmits the data on the PDSCH to a UE, and the PDSCH is one of a plurality of PDSCHs received by the UE from a plurality of TRPs. On each of the plurality of PDSCHs and corresponding PUCCHs, a respective HARQ-ACK process may be performed.

Based on the determination using the indicator whether or not the data has been successfully decoded by the UE receiving the PDSCHs, the network node continues or terminates the HARQ process. The HARQ process is terminated and no further retransmission is made if the common indicator indicates the value of a (positive) ACK. Accordingly, if the data could be successfully decoded based on the result of soft combining or based on transmission successful decoding of at least one PUSCH, no more repetition is performed in the PDSCH and in any of the plurality of PDSCHs transmitted respectively from the plurality of TRPs. A retransmission at least one or in any PUSCH only needs to be made if none of the decoding process of the data using any PDSCH was successful.

The plurality of HARQ-ACK processes thus perform transmission of the same data, for instance in multi-TRP communication. Each of the plurality of PUCCHs is received by respectively the same TRP from which the PDSCH with which the PUCCH is associated has been transmitted.

As indicated above, different associations between one or more base stations and the plurality of TRPs are possible.

In some exemplary embodiments, the PDSCH used in the transmission by the network node may be a first downlink channel from among the plurality of downlink shared channels. The network node transceiver 670 comprises a first TRP and, in operation, transmits the data on the first downlink shared channel using the first TRP, receives the indicator on the uplink control channel associated with the first downlink shared channel using the first TRP. The network node further comprises a backhaul interface and transmits, over the backhaul interface, scheduling information for scheduling transmission of the data a second downlink shared channel from among the plurality of downlink shared channels by a second TRP.

For instance, the backhaul interface may be an interface to a backhaul link from a baseband unit of the gNB to a RF unit which controls RF operation of the second TRP, wherein the second TRP and the RF unit may be included or associated with the network node.

Alternatively, the backhaul interface may be an interface to a backhaul link from the network node (or its baseband unit) to a baseband unit which may be associated with and/or comprised by a different (remote network) network node.

A backhaul link may be used for transmitting and receiving the data and/or control information to or from two or more given network nodes transmitting the data using respective TRPs in respective HARQ-ACK processes, or for transmitting and/or receiving scheduling data for scheduling transmission/reception on the respective HARQ processes.

The respective HARQ-ACK processes performed using the plurality of TRPs may be considered as a single multi TRP HARQ process which includes transmission using a plurality of PUSCHs and corresponding PUCCHs. In particular, the HARQ process is terminated, and no more retransmission is made if the data has been successfully decoded irrespective of the particular PDSCH or PDSCHs from which successful decoding could be performed.

A complete multi-TRP HARQ-ACK process may use the same plurality of TRPs in each transmission. However, the TRPs, and thus the PDCCHs, may be switched either between HARQ-ACK processes for a given UE or between subsequent transmissions of a multi-TRP HARQ-ACK process. Switching among sets of TRPs respectively comprising (at least partially) different TRPs may be scheduled using a PDCCH. Moreover, coordination information, which also may include an indication which TRPs are to be used for a subsequent transmission, may be transmitted from a network node to another network node and/or to one or more TRPs using the backhaul.

In some embodiments, the data is transmitted on two given PDSCHs using respectively different modulation and coding schemes (MCS). For instance, the network node circuitry encodes the data for transmission on a first downlink shared channel among the plurality of downlink channels using a first MCS different from a second MCS used for transmitting the data on a second downlink shared channel from among the plurality of downlink shared channels. As mentioned above, the second downlink shared channel is transmitted from a TRP different from the TRP used for transmission of the first downlink shared channel. Respectively different MCS may be used if the UE performs and decodes and CRC checks the data from the respective PDSCHs separately, as described above.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

Some non-limiting examples of such communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

According to some embodiments, the present disclosure provides a user equipment comprising a transceiver which, in operation, receives data on a plurality of downlink shared channels, the data received on the plurality of downlink shared channels being respectively the same data, and circuitry which, in operation, decodes the data, generates an indicator which indicates whether or not the data has been successfully decoded using the plurality of downlink shared channels, wherein the transceiver, in operation, transmits the indicator on at least one of a plurality of uplink control channels associated respectively with the plurality of downlink shared channels.

In some embodiments, the transceiver, in operation, transmits the indicator on each of the plurality of uplink control channels associated respectively with the plurality of downlink shared channels.

For instance, the transceiver, in operation, receives the plurality of downlink shared channels respectively from a plurality of TRPs, transmission and reception points, and transmits the indicator on the plurality of uplink control channels respectively to the plurality of TRPs.

According to some embodiments, the indicator is a common indicator which indicates a common result of decoding using at least two downlink shared channels among the plurality of downlink shared channels, the common indicator being a one-bit indicator.

For example, the circuitry, in operation, respectively decodes the plurality of downlink shared channels, performs a logical "OR" operation on respective results of the decoding of the plurality of downlink shared channels, and the common indicator indicates the result of the logical "OR" operation.

In some exemplary embodiments, the circuitry, in operation, generates, for each of the plurality of downlink shared channels, a respective indicator indicating whether or not the data has been successfully decoded using the respective downlink shared channel, and the transceiver, in operation, transmits, on each of the plurality of uplink control channels, the common indicator and the respective indicator indicating the result of decoding the downlink shared channel associated respectively with the uplink control channel.

For instance, the transceiver, in operation, respectively transmits, on each of the plurality of uplink control channels, an ACK/NACK, acknowledgement/negative acknowledgement signal including the common indicator and the respective indicator.

In some embodiments, transceiver, in operation, transmits the respective indicator on each of the plurality of uplink control channels before the circuitry accomplishes performing the logical "OR" operation.

In some embodiments, the circuitry, in operation, respectively decodes the plurality of downlink shared channels, and the indicator includes a plurality of bits each of which indicates whether or not the data has been successfully decoded using a respective one of the plurality of downlink shared channels.

For example, the data received on a first downlink shared channel among the plurality of downlink shared channels has been encoded using a first MCS, modulation and coding scheme, different from a second MCS used for transmitting the data on a second downlink shared channel from among the plurality of downlink shared channels.

In some exemplary embodiments, the circuitry, in operation, performs soft-combining on the data received on the plurality of downlink shared channels, decodes the combined data obtained by the soft-combining, and generates the indicator based on the result of the decoding of the combined data.

Further embodiments provide a network node, comprising a transceiver which, in operation, transmits data on a downlink shared channel from among a plurality of downlink shared channels, the data transmitted on the plurality of downlink shared channels being respectively the same data, and receives, on an uplink control channel associated with the downlink shared channel, an indicator which indicates whether or not the transmitted data has successfully been received and decoded using the plurality of downlink shared channels, and circuitry which, in operation, determines, based on the indicator, whether or not the data has been successfully received and decoded.

For instance, said downlink shared channel from among the plurality of downlink shared channels is a first downlink shared channel, the transceiver comprises a first TRP, transmission and reception point, and, in operation, transmits the data on the first downlink shared channel using the first TRP, receives the indicator on the uplink control channel associated with the first downlink shared channel using the first TRP, and the network node further comprises a backhaul interface and transmits, over the backhaul interface, scheduling information for scheduling transmission of the data a second downlink shared channel from among the plurality of downlink shared channels by a second TRP.

According to some embodiments, said downlink shared channel from among the plurality of downlink shared channels is a first downlink shared channel the circuitry, in operation, encodes the data for transmission on the first downlink shared channel using a first MCS, modulation and coding scheme, different from a second MCS used for transmitting the data on a second downlink shared channel from among the plurality of downlink shared channels.

In some embodiments, the indicator is a common indicator which indicates a common result of decoding using at least two downlink shared channels among the plurality of downlink shared channels, the common indicator being a one-bit indicator.

For instance, the common indicator indicates a result of a logical "OR" operation performed on respective results of the decoding of the plurality of downlink shared channels.

For instance, the transceiver, in operation, receives the common indicator and a respective indicator indicating whether or not the data has been successfully decoded using a respective downlink shared channel transmitted by said network node.

For instance, the transceiver, in operation, receives an ACK/NACK acknowledgement/negative acknowledgement, signal including the common indicator and the respective indicator.

For instance, the circuitry, in operation, receives the respective indicator before the common indicator, the respective indicator and the common indicator being received in separate ACK/NACK signals.

For instance, and the indicator includes a plurality of bits each of which indicates whether or not the data has been successfully decoded using a respective one of the plurality of downlink shared channels.

In some embodiments, the indicator indicates a result of the decoding of the combined data obtained by soft-combining of the data from the plurality of downlink shared channels.

Further provided is a communication method for a user equipment, comprising the steps of receiving data on a plurality of downlink shared channels, the data received on the plurality of downlink shared channels being respectively the same data, decoding the data, generating an indicator which indicates whether or not the data has been successfully decoded using the plurality of downlink shared channels, and transmitting the indicator on at least one of a plurality of uplink control channels associated respectively with the plurality of downlink shared channels.

In some embodiments, the indicator is transmitted on each of the plurality of uplink control channels associated respectively with the plurality of downlink shared channels.

For instance, the plurality of downlink shared channels are received respectively from a plurality of TRPs, transmission and reception points, and the indicator is transmitted on the plurality of uplink control channels respectively to the plurality of TRPs.

According to some embodiments, the indicator is a common indicator which indicates a common result of decoding using at least two downlink shared channels among the plurality of downlink shared channels, the common indicator being a one-bit indicator.

For example, the plurality of downlink shared channels are respectively decoded, and the method includes performing a logical "OR" operation on respective results of the decoding of the plurality of downlink shared channels, and the common indicator indicates the result of the logical "OR" operation.

For instance, the method includes generating, for each of the plurality of downlink shared channels, a respective indicator indicating whether or not the data has been successfully decoded using the respective downlink shared channel, and the common indicator and the respective indicator indicating the result of decoding the downlink shared channel associated respectively with the uplink control channel are transmitted respectively on each of the plurality of downlink shared channels.

For instance, on each of the plurality of uplink control channels, an ACK/NACK, acknowledgement/negative acknowledgement signal including the common indicator and the respective indicator is respectively transmitted.

In some embodiments, the respective indicator on each of the plurality of uplink control channels is transmitted before accomplishing performing the logical "OR" operation.

For instance, the plurality of downlink shared channels are respectively decoded, and the indicator includes a plurality of bits each of which indicates whether or not the data has been successfully decoded using a respective one of the plurality of downlink shared channels.

For example, the data received on a first downlink shared channel among the plurality of downlink shared channels has been encoded using a first MCS, modulation and coding scheme, different from a second MCS used for transmitting the data on a second downlink shared channel from among the plurality of downlink shared channels.

In some embodiments, the method includes performing soft-combining on the data received on the plurality of downlink shared channels, decoding the combined data obtained by the soft-combining, and generating the indicator based on the result of the decoding of the combined data.

The disclosure further provides a communication method for a network node, comprising the steps of transmitting data on a downlink shared channel from among a plurality of downlink shared channels, the data transmitted on the plurality of downlink shared channels being respectively the same data, receiving, on an uplink control channel associated with the downlink shared channel, an indicator which indicates whether or not the transmitted data has successfully been received and decoded using the plurality of downlink shared channels, and determining, based on the indicator, whether or not the data has been successfully received and decoded.

For instance, said downlink shared channel from among the plurality of downlink shared channels is a first downlink shared channel, the method comprises transmitting the data on the first downlink shared channel using a first TRP, receiving the indicator on the uplink control channel associated with the first downlink shared channel using the first TRP, and transmitting, over a backhaul interface, scheduling information for scheduling transmission of the data a second downlink shared channel from among the plurality of downlink shared channels by a second TRP.

According to some embodiments, said downlink shared channel from among the plurality of downlink shared channels is a first downlink shared channel the circuitry, and the method comprises encoding the data for transmission on the first downlink shared channel using a first MCS, modulation and coding scheme, different from a second MCS used for transmitting the data on a second downlink shared channel from among the plurality of downlink shared channels.

In some embodiments, the indicator is a common indicator which indicates a common result of decoding using at least two downlink shared channels among the plurality of downlink shared channels, the common indicator being a one-bit indicator.

For instance, the common indicator indicates a result of a logical "OR" operation performed on respective results of the decoding of the plurality of downlink shared channels.

In some embodiments, the common indicator and a respective indicator indicating whether or not the data has been successfully decoded using a respective downlink shared channel transmitted by said network node are received.

For instance, an ACK/NACK acknowledgement/negative acknowledgement, signal including the common indicator and the respective indicator is received.

In some embodiments, the respective indicator is received before receiving the common indicator, the respective indicator and the common indicator being received in separate ACK/NACK signals.

For instance, the indicator includes a plurality of bits each of which indicates whether or not the data has been successfully decoded using a respective one of the plurality of downlink shared channels.

In some embodiments, the indicator indicates a result of the decoding of the combined data obtained by soft-combining of the data from the plurality of downlink shared channels.

Summarizing, the present disclosure relates to a user equipment, a network node and respective communication methods for a user equipment and a network node. A according to some embodiments, a user equipment comprises a transceiver which, in operation, receives data on a plurality of downlink shared channels, the data received on the plurality of downlink shared channels being respectively the same data, and circuitry which, in operation, decodes the data, generates an indicator which indicates whether or not the data has been successfully decoded using the plurality of downlink shared channels. The transceiver, in operation, transmits the indicator on at least one of a plurality of uplink control channels associated respectively with the plurality of downlink shared channels.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment, comprising:
a transceiver which, in operation, receives data on a plurality of downlink shared channels, the data received on the plurality of downlink shared channels being respectively the same data; and
circuitry which, in operation, decodes the data on the plurality of downlink shared channels, generates, for each of the plurality of downlink shared channels, a respective indicator which indicates whether or not the data has been successfully decoded using the respective downlink shared channel; wherein
the circuitry, in operation, performs a logical "OR" operation on respective results of the decoding of at least two downlink shared channels among the plurality of downlink shared channels, and generates a common indicator which indicates the result of the logical "OR" operation, the common indicator being a one-bit indicator,
the transceiver, in operation, transmits, on each of a plurality of uplink control channels associated respectively with the plurality of downlink shared channels, the respective indicator indicating the result of decoding the downlink shared channel associated respectively with the uplink control channel before the circuitry accomplishes performing the logical "OR" operation, and
the transceiver, in operation, transmits the common indicator on each of the plurality of uplink control channels.

2. The user equipment according to claim 1, wherein the transceiver, in operation, receives the plurality of downlink shared channels respectively from a plurality of TRPs, transmission and reception points, and transmits the respective indicator and the common indicator on the plurality of uplink control channels respectively to the plurality of TRPs.

3. The user equipment according to claim 1, wherein the transceiver, in operation, respectively transmits, on each of the plurality of uplink control channels, an ACK/NACK, acknowledgement/negative acknowledgement, signal including the common indicator and the respective indicator.

4. The user equipment according to claim 1, wherein the respective indicators are a plurality of bits each of which indicates whether or not the data has been successfully decoded using a respective one of the plurality of downlink shared channels.

5. The user equipment according to claim 1, wherein the circuitry, in operation, performs soft-combining on the data received on the plurality of downlink shared channels, decodes the combined data obtained by the soft-combining, and generates the respective indicator based on the result of the decoding of the combined data.

6. A network node, comprising:
a transceiver which, in operation,
transmits data on a downlink shared channel from among a plurality of downlink shared channels, the data transmitted on the plurality of downlink shared channels being respectively the same data,
receives, on each of a plurality of uplink control channels respectively associated with the plurality of downlink shared channels, a respective indicator which indicates whether or not the transmitted data has successfully been received and decoded using the respective downlink shared channel, and
after receiving the respective indicator, receives, on each of the plurality of uplink channels, a common indicator which indicates a result of a logical "OR" operation performed on respective decoding results of at least two downlink shared channels among the plurality of downlink shared channels, the common indicator being a one-bit indicator; and
circuitry which, in operation, determines, based on the respective indicator and the common indicator, whether or not the data has been successfully received and decoded.

7. The network node according to claim 6, wherein said downlink shared channel from among the plurality of downlink shared channels is a first downlink shared channel,
the transceiver comprises a first TRP, transmission and reception point, and, in operation, transmits the data on the first downlink shared channel using the first TRP, receives the respective indicator and the common indicator on the uplink control channel associated with the first downlink shared channel using the first TRP, and
the network node further comprises a backhaul interface and transmits, over the backhaul interface, scheduling information for scheduling transmission of the data on a second downlink shared channel from among the plurality of downlink shared channels by a second TRP.

8. The network node according to claim 6, wherein said downlink shared channel from among the plurality of downlink shared channels is a first downlink shared channel and the circuitry, in operation, encodes the data for transmission on the first downlink shared channel using a first MCS, modulation and coding scheme, different from a second MCS used for transmitting the data on a second downlink shared channel from among the plurality of downlink shared channels.

9. A communication method for a user equipment, comprising the steps of:
receiving data on a plurality of downlink shared channels, the data received on the plurality of downlink shared channels being respectively the same data;
decoding the data on the plurality of downlink shared channels;
generating, for each of the plurality of downlink shared channels, a respective indicator which indicates whether or not the data has been successfully decoded using the respective downlink shared channel;
performing a logical "OR" operation on respective results of the decoding of at least two downlink shared channels among the plurality of downlink shared channels, and generating a common indicator which indicates the result of the logical "OR" operation, the common indicator being a one-bit indicator;
transmitting, on each of a plurality of uplink control channels associated respectively with the plurality of downlink shared channels, the respective indicator indicating the result of decoding the downlink shared channel associated respectively with the uplink control channel before the performing of the logical "OR" operation is accomplished; and
transmitting the common indicator on each of the plurality of uplink control channels.

10. A communication method for a network node, comprising the steps of:
transmitting data on a downlink shared channel from among a plurality of downlink shared channels, the data transmitted on the plurality of downlink shared channels being respectively the same data;
receiving, on each of a plurality of uplink control channels respectively associated with the plurality of downlink shared channels, a respective indicator which indicates whether or not the transmitted data has successfully been received and decoded using the respective downlink shared channel;
after receiving the respective indicator, receiving, on each of the plurality of uplink channels, a common indicator which indicates a result of a logical "OR" operation performed on respective decoding results of at least two downlink shared channels among the plurality of downlink shared channels, the common indicator being a one-bit indicator; and
determining, based on the respective indicator and the common indicator, whether or not the data has been successfully received and decoded.

* * * * *